April 16, 1957  A. E. NEUHAUSER  2,788,991
DISCONNECTING ADAPTER FOR ADJACENT JOINTS
OF PARALLEL PIPES
Filed April 4, 1955

INVENTOR.
Albert E. Neuhauser
BY

United States Patent Office 2,788,991
Patented Apr. 16, 1957

2,788,991

DISCONNECTING ADAPTER FOR ADJACENT JOINTS OF PARALLEL PIPES

Albert E. Neuhauser, Fairview, Mass., assignor to Reda-Turner Manufacturing Company, Inc., Springfield, Mass., a corporation of Massachusetts Application April 4, 1955, Serial No. 499,014

3 Claims. (Cl. 285—18)

This invention relates to improvements in devices for manipulating the couplings of hose lines.

The principal object of the invention is the provision of apparatus for quickly and easily decoupling the male and female coupling members of hose lines and particularly to coupling devices including male and female members where the male member is releasably coupled in the female member and is decoupled therefrom by relative axial movements of the member.

It is usual in connection with mobile apparatus to secure male coupling members to a tractor which are connected to the outlet and return of an air supply. A pair of hose lengths extend from a unit or units requiring compressed air and have associated therewith female coupling members for connection with the male members. The female members are pushed onto the male members and said members are releasably locked. To decouple the members, the female members are again pushed towards the male members to accomplish the decoupling.

Considerable pressure is required for coupling and decoupling the members and to overcome the resistance attendant upon the manual manipulation of the coupling members, apparatus is provided to facilitate manipulations easily and quickly.

To couple the male and female members a portion of the female member for receiving the male member is extended and it subsequently retracts so as to embrace the male member. To decouple the members the portion of the female member is extended to release the male member. The portion of the female member is moved axially to its extended position. The coupling is shown in U. S. Patent 2,548,528 of April 10, 1951.

According to novel features of the invention the apparatus carries female members of supply and return base lines of a unit requiring air under pressure. The apparatus is constructed and arranged for the simultaneous easy and ready extension of the extendable portions of the female members to facilitate the coupling and decoupling of the coupling members.

All of the above cited objects I accomplish by means of such structure and relative arrangement of parts thereof, as will fully appear by a perusal of the description below and by various specific features which will be hereinafter set forth.

To these above and other ends and with the foregoing and various other and ancillary features and advantages and objects of my invention as will become more readily apparent as the description proceeds, my invention consists in certain features of novelty, in a mode of operation, and in the combination, organization, and arrangement of parts as will be hereinafter more particularly pointed out in the claims annexed hereto and more fully described and referred to in conjunction with the accompanying drawings wherein:

Figure 1:
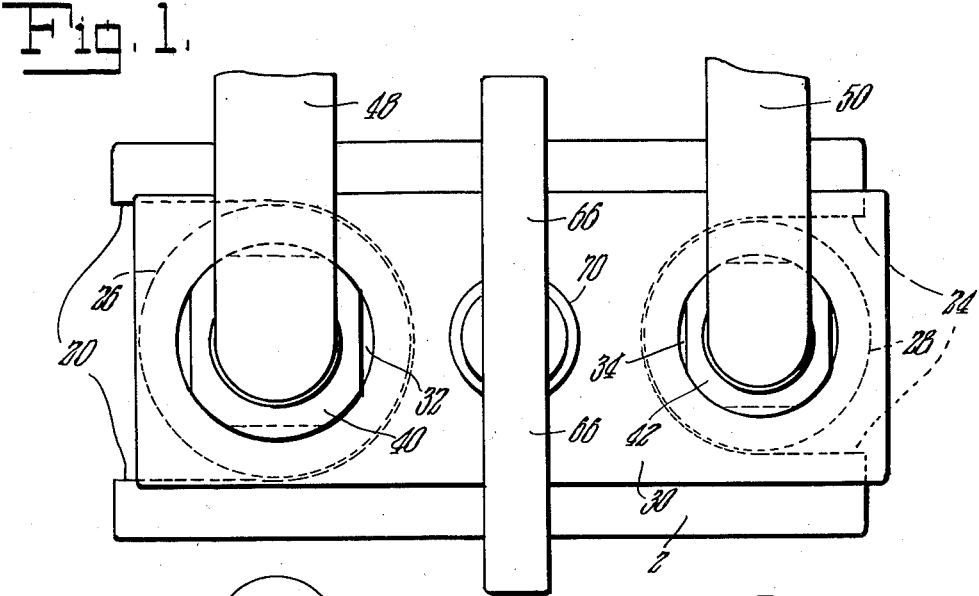
Fig. 1 is a plan view of the apparatus of the invention.
Figure 2:
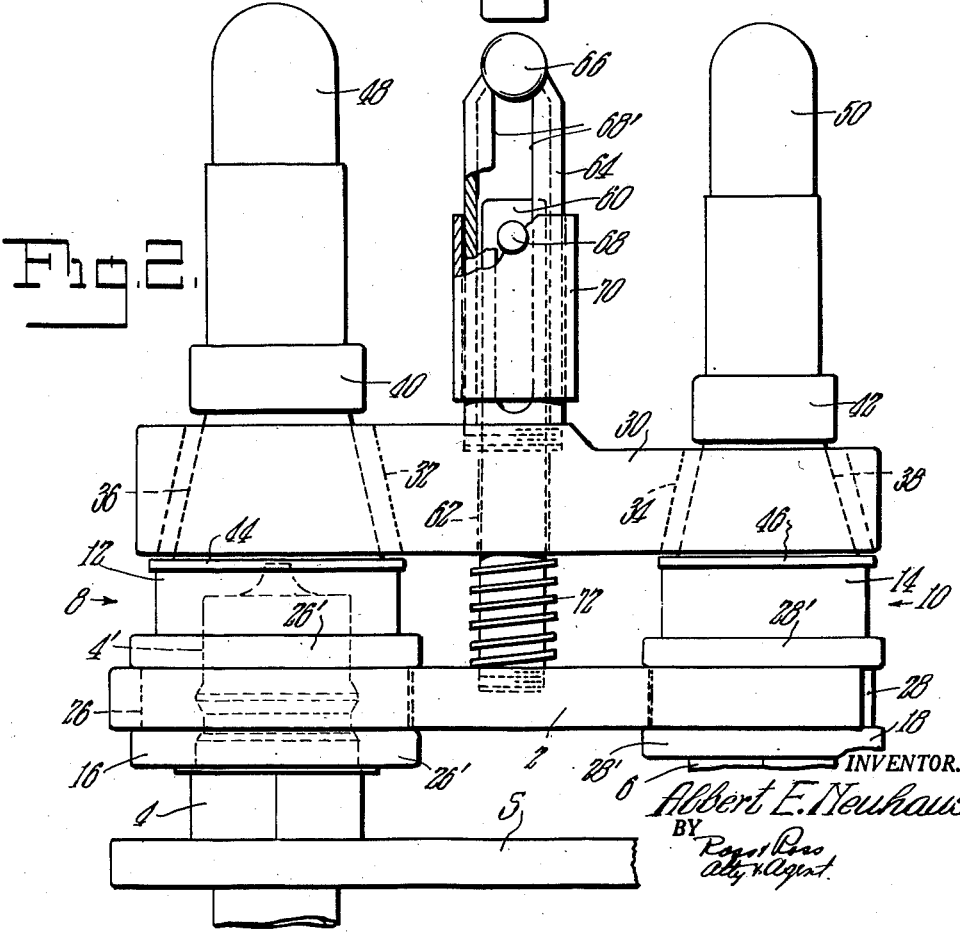
Fig. 2 is a side elevational view of the apparatus shown in Fig. 1.

Referring now to the drawings in detail the invention will be fully described.

A support S is shown to which male couplings such as 4 and 6 are secured. The support may be a part of a tractor or the like with the male couplings connected by hose to an air supply and return thereto.

Female coupling members 8 and 10 are shown which have portions which are extendable. That is, upper portions 12 and 14 of the female coupling members are slidable outwardly and downwardly relative to lower portions 16 and 18 against compression springs so that lower ends of the portions 12 and 14 receive the upper portions of the male couplings, such as 4'. When released the upper portions 12 and 14 retract and the male members are locked in the female members. To decouple the male and female members the portions 12 and 14 are again extended.

The couplings form no part of the invention and need not be further described. The apparatus of the invention carries the female coupling members and is arranged to distend the upper portions thereof relative to the lower portions thereof.

A lower plate 2 has open ended slots 20 and 24 which receive waist portions 26 and 28 of the lower portions of the female coupling members, and flanges 26' and 28' hold the portions 26 and 28 against axial movements relative to plate 2. An upper plate 30 has openings 32 and 34 through which necks 36 and 38 of the upper portions of the female couplings extend. Upper heads 40 and 42 are above the plate 30 and with flanges 44 and 46 hold the upper portions of the female couplings against axial movement relative to plate 30.

The heads 40 and 42 are flattened on opposite sides as are the openings 32 and 34, as shown. In assembling the parts, the flats of the heads and openings are aligned for passage of the heads through the openings. Thereafter the upper portions of the female couplings are turned one hundred eighty degrees or so to the position shown.

Supply and return lines 48 and 50 which are flexible are connected to upper portions of the couplings and will be such as to extend to the unit using air.

A stem 60 has a lower end fixed to the plate 2 and extends upwardly therefrom through a hole 62 in the plate 30 and through a tube 64 having a lower end fixed in the plate 30. An upper handle 66 is fixed to the upper end of tube 64. A lower handle 68 is fixed to the upper end of rod 60 and the tube 64 is provided with a slot 68' for movement of handle 68 up and down. A sleeve 70 surrounding the tube 64 is fixed at its upper end to the handle 68. A spring 72 surrounds rod 60 between plates 2 and 30 to urge plate 30 upwardly.

Assume that the male coupling members 4 and 6 are rigidly fixed in relatively spaced relation to a support such as for instance a tractor part and are connected to the supply and return lines of means for supplying air under pressure. The upper portions of the female coupling members are carried by the upper pressure plate 30 and are movable downwardly against springs so that they are extended relative to lower portions of said female coupling members which are carried by the lower plate 2. In the extended position of the upper portions of the female coupling members the male coupling members are received therein. When the upper portions of the coupling members are released they are retracted by spring action so as to lock the male members therein. To couple the male and female coupling members the female members are extended to receive the male members and then released. To decouple the male and female members the female members are extended so that the male members are released.

As stated, the female coupling members may be connected through hose lines to a unit requiring a supply of air under pressure. A number of different units may require air and each have hose lines connected to female coupling members associated with different devices of the invention.

To decouple the female coupling members from the male members the bars 66 and 68 of the apparatus are squeezed by the fingers of the hand whereby the lower plate 2 is moved upwardly towards the upper plate 30. This movement of plate 30 moves lower portions of the female members upwardly simultaneously to extend lower portions thereof and release the male members. In the extended position the female members are moved away from the male members and the members 66 and 68 are released. To couple the male and female members the members 66 and 68 may be squeezed together to extend the upper portions of the female members. Lower ends of the upper portions are placed in receiving position to receive the male members and then the members 66 and 68 are released.

Thus by manipulations of the members 66 and 68, the female coupling members are easily and readily decoupled from or coupled to the male members.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Apparatus for coupling and decoupling a pair of male and a pair of female couplings comprising, a pair of female couplings each having lower portions and upper portions slidable axially relative thereto for coupling and decoupling the female couplings with male couplings, an elongated support, a pair of male couplings having lower portions secured in opposite ends of said support and coupling portions extending upwardly therefrom for coupling in the lower ends of the female couplings, a lower plate for supporting the lower portions of the female couplings for connection of the male couplings therewith, a rod having a lower end secured in the lower plate intermediate the opposite ends thereof and extending upwardly therefrom, an upper plate slidable on said rod and connections between said plate and the upper portions of the female couplings holding said plate and portions against axial separation, a spring around said rod urging said lower and upper plates apart, a tube having a lower end fixed in said upper plate extending upwardly therefrom around said rod, relatively spaced manually engageable members carried by said rod and tube for drawing the lower plate towards said upper plate against said spring to slide the upper portions of the female couplings relative to the lower portions thereof.

2. Apparatus for coupling and decoupling a pair of male and a pair of female couplings set forth in claim 1 wherein said manually engageable members are fixed to upper ends of said rod and tube respectively.

3. Apparatus for coupling and decoupling a pair of male and a pair of female couplings set forth in claim 1 wherein the connections holding the upper plate and upper portions of the female couplings include open ended slots provided in said plate in which said upper portions of the female couplings are disposed and relatively spaced enlargements provided on said coupling portions above and below said plate and slots.

References Cited in the file of this patent

UNITED STATES PATENTS

| 2,522,075 | Heem | Sept. 12, 1950 |
| 2,694,330 | Davies et al. | Nov. 16, 1954 |
| 2,699,961 | Omon et al. | Jan. 18, 1955 |

FOREIGN PATENTS

| 663,920 | Great Britain | Dec. 27, 1951 |